United States Patent [19]

Ferry

[11] 4,089,545
[45] May 16, 1978

[54] VEHICLE SAFETY SEATING

[76] Inventor: Hugh J. Ferry, 12043 Arroyo Dr., Santa Ana, Calif. 92705

[21] Appl. No.: 719,172

[22] Filed: Aug. 31, 1976

[51] Int. Cl.² .............................................. B60R 21/04
[52] U.S. Cl. .................................... 280/751; 280/748; 280/752; 296/65 A
[58] Field of Search ............... 280/727, 748, 751, 752, 280/753; 296/65 A; 297/216; 180/90

[56] References Cited

U.S. PATENT DOCUMENTS

| 3,524,678 | 8/1970 | De Lavenne | 280/150 B |
|---|---|---|---|
| 3,829,122 | 8/1974 | Bastide | 280/150 B |
| 3,843,155 | 10/1974 | Foster | 280/150 B |
| 3,861,486 | 1/1975 | Wilfert | 180/90 |
| 3,917,339 | 6/1974 | Fritz | 296/65 A |

FOREIGN PATENT DOCUMENTS 93,128   2/1969   France ................ 296/65 A

Primary Examiner—Joseph F. Peters, Jr.
Assistant Examiner—Terrance L. Siemens
Attorney, Agent, or Firm—William H. Maxwell

[57] ABSTRACT

A passenger compartment and seating for vehicles, adapted to distribute and retard impact forces due to collision, and to embrace the passengers for both primary and subsequent impacts. A dash configuration is cooperatively related to a front seat configuration with the back of the front seat cooperatively related to the front of a rear seat. The dash and seats are cushioned, and the seats are moveable upon deceleration to embrace a passenger between the dash and the front seat and to embrace a passenger between the front seat and the rear seat. The forward movement of the seats relative to each other and of the front seat into spaced relation to the dash, is restricted. There is a retarded forward motion of the following rear seat into spaced relation to the front seat. The passengers are passively embraced between the forwardly shifted spaced seats or the front seat and dash.

26 Claims, 9 Drawing Figures

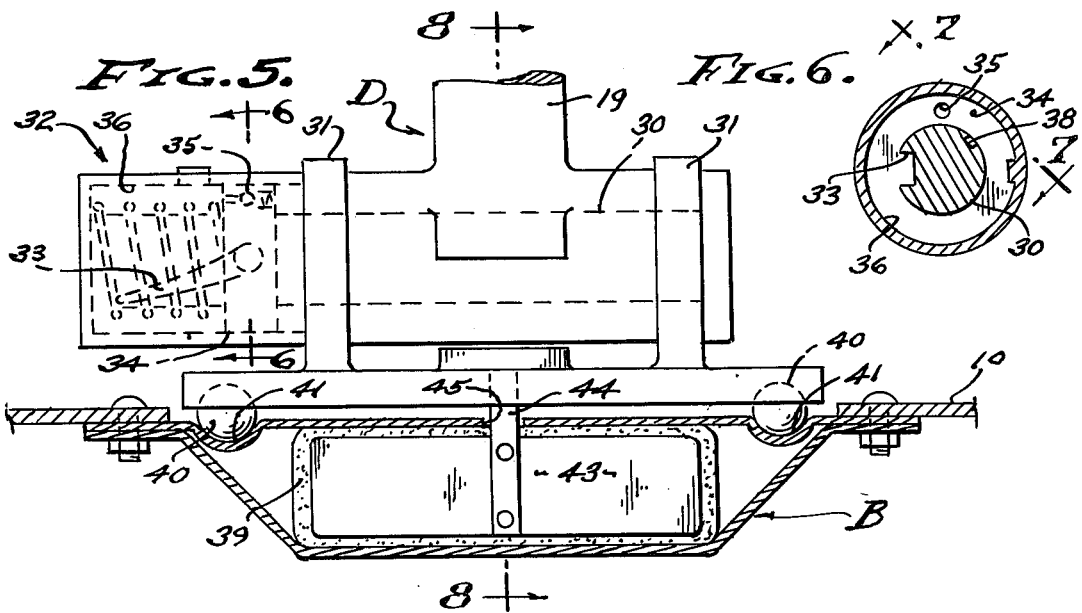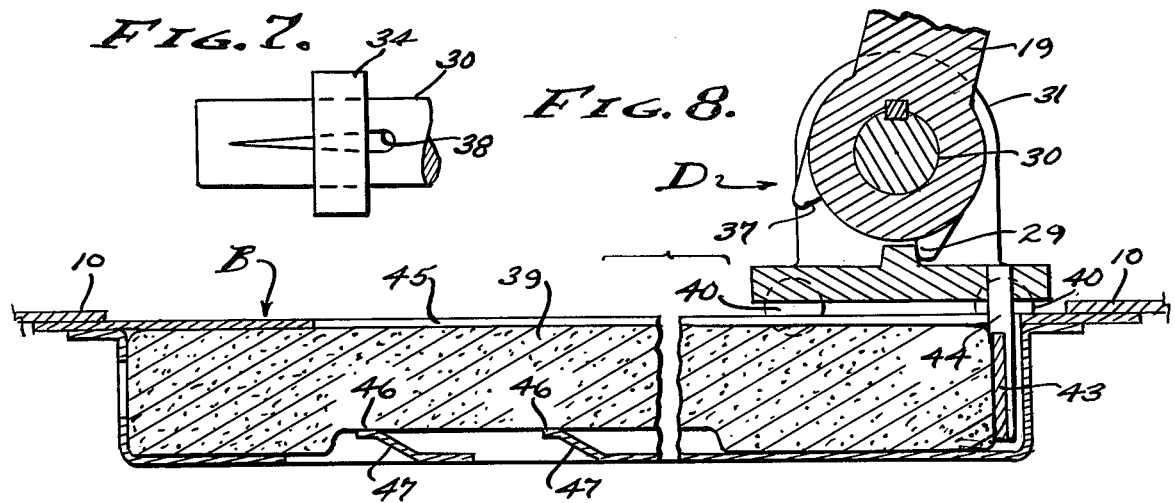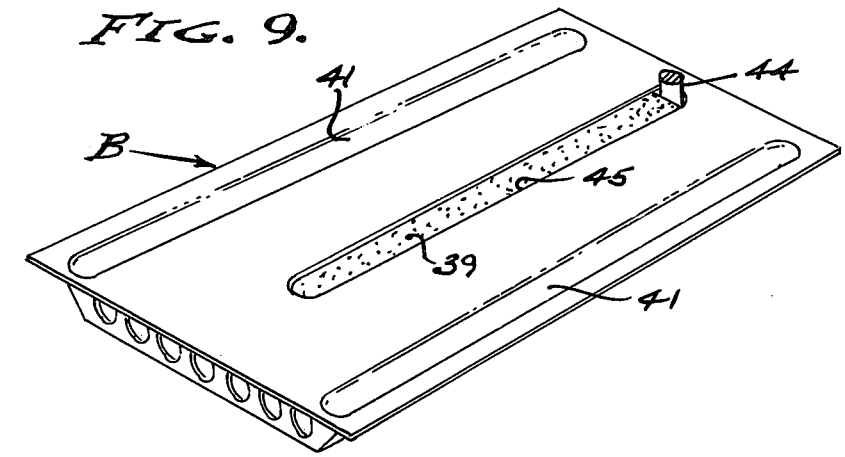

VEHICLE SAFETY SEATING

BACKGROUND

The accepted approach to vehicle safety has been to provide a vehicle structure that retains its general internal form under impact and wherein the passenger compartment configurations are such as to avoid point impact with sharp or hard interior surfaces. In particular it is high stress contact with the head and upper torso which is to be avoided. The rate of collapse of the vehicle structure and its compartment structure is a factor, and a primary object is to retard deceleration of the passengers with respect to said compartment structures, and all of which is accomplished with the present invention by means of a cooperative relationship in the combination of the dash and seating configurations and construction, and their movements relative to each other. With the present invention, the passengers are projected against a frontal padded surface and clamped into position with the seat they occupy. The passengers remain captive during any subsequent collisions; it being recognized that there is often a chain of impacts as a result of collisions following in sequence.

Heretofore, energy absorption has been practiced in the use of padded compartment interiors and seat cushioning, and mechanical devices have been provided to control the rate of deceleration of both front and rear seat passengers; also to absorb the shock load of impact from rear seat passengers that would otherwise be applied to front seat passengers. For instance, moveable seat structures have been provided wherein deceleration forces are absorbed in the seat structures and/or mountings therefor; and with these concepts seat belting and harnessing is required so as to confine the passengers to their seats. With the present invention, operation is essentially passive since the use of seat belts and/or harnesses is not mandatory, although the use thereof is not objected to and is to be recommended, seat belts being especially useful in lateral collisions.

It is a general object of this invention to provide a passive protective system that becomes operable during most crash sequences to position the occupants between energy absorbing surfaces, thereby immobilizing them during the critical time span during an accident, and with the absorbed impact energy released over an extended time period. Inflatable bags have been proposed and employed for such purposes, but air bag systems are expendable during a collision and once actuated provide no subsequent protection in a chain accident sequence. Furthermore, air bag systems require the expense and complexity of sensitive accelerometers to trigger inflation with a high pressure gas source. It is significant therefore, that the present invention provides for the protective passive seating of passengers during a total accident sequence, and all of which is without complexity.

Padded dash panels are commonplace in motor cars and the like, and to various degrees do ameliorate injuries. However, the front window remains to present an extreme hazard. Like the air bag system referred to above, it is an object of this invention to provide a protective dash panel that is operable during collision to occlude, partially at least, the front window and to raise and form a face or head cushion for the front passengers. The dash panel of the present invention is ported for access to vehicle steering and controls, and for visibility of the necessary instrument displays.

Collapsible, or collapse rate, seating has been provided in the form of forwardly shiftable seats that slide or pivot relative to the vehicle body structure during the deceleration phase of a collision, and with means to prevent immediate restoration of the impact energy that would cause rebound after the impact. Release of the passengers from restraint of the seating is a requirement subsequent to the collision or chain thereof. Accordingly, it is an object of this invention to provide a cushioned compartment and seating wherein impact energy stored in the compressed cushions is released slowly after impact.

A feature of this invention and an object thereof is to provide protection for the passengers positioned forwardly of other passengers. In other words, front passengers are protected from the impact forces resulting from the following movement which brings the latter forwardly into impact with the former. With the present invention it will be observed that the dash and seating profiles are compatible for the cooperative clamping of the front and rear passengers therebetween, only upon collision and application of severe deceleration forces. To this end, both the front and back seating has its forward limit of pivotal movement into the complimentary positions shown, while the back seating has limited forward shifting of a pivot therefor. The distance traveled by the rear seat passengers and their seats ensures that the force loads on the front seat passengers occurs subsequent to said front seat passenger's impact with the aforesaid frontal padding. Restraint of front and rear passengers is assured by embracement during first and subsequent impacts as may be caused by a chain of collisions one immediately subsequent to another.

SUMMARY OF INVENTION

The vehicle safety seating herein disclosed employs the principle of energy absorption and is characterized by the capability of restraining the occupants throughout the time span of an accident sequence involving one or more impacts. The dash panel of the passenger compartment is deeply cushioned for the absorption of impact energy and such as to release said energy at a retarded rate so as to reduce rebound. The dash panel configuration is such as to partially overlie the laps of the front seat passengers, and it is formed so as to buckle upwardly into a cushion that partially occludes the front window and to receive impacts from the heads of the passengers. The front and rear seating is essentially the same, and comprised of bucket seats (bench seating being feasible if so desired) form fitted to passenger anatomy in a seated posture; the seat profile being that of a lounge chair with arcuately continuous seat, back and head portions. The seats, like the dash panel, are deeply cushioned both front and back for the absorption of impact energy and retarded release thereof. In accordance with this invention, the front seat is cooperatively combined with the dash panel to move forwardly upon severe deceleration forces and into stopped spaced relation thereto with the seated occupant restrained therebetween. Similarly, the rear seat is cooperatively combined with the front seat to move forwardly upon severe deceleration forces and into stopped spaced relation thereto with the seated occupant restrained therebetween. The rear seat is carried upon a collapsible mounting means, and both front and rear seats are locked forwardly during the time span of the collision sequence, there being means to slowly release the same subsequently to said accident sequence.

DRAWINGS

The various objects and features of this invention will be fully understood from the following detailed description of the typical preferred form and application thereof, throughout which description reference is made to the accompanying drawings, in which:

FIG. 5 is an enlarged detailed sectional view taken as indicated by line 5—5 on FIG. 1.

FIG. 6 is a sectional view taken as indicated by line 6—6 on FIG. 5.

FIG. 7 is a fragmentary view taken as indicated by line 7—7 on FIG. 6.

FIG. 8 is a sectional view taken as indicated by line 8—8 on FIG. 5 and

FIG. 9 is a perspective view of the energy absorbing adaptation to the floor structure which supports the rear seating.

PREFERRED EMBODIMENT

Figure 1:
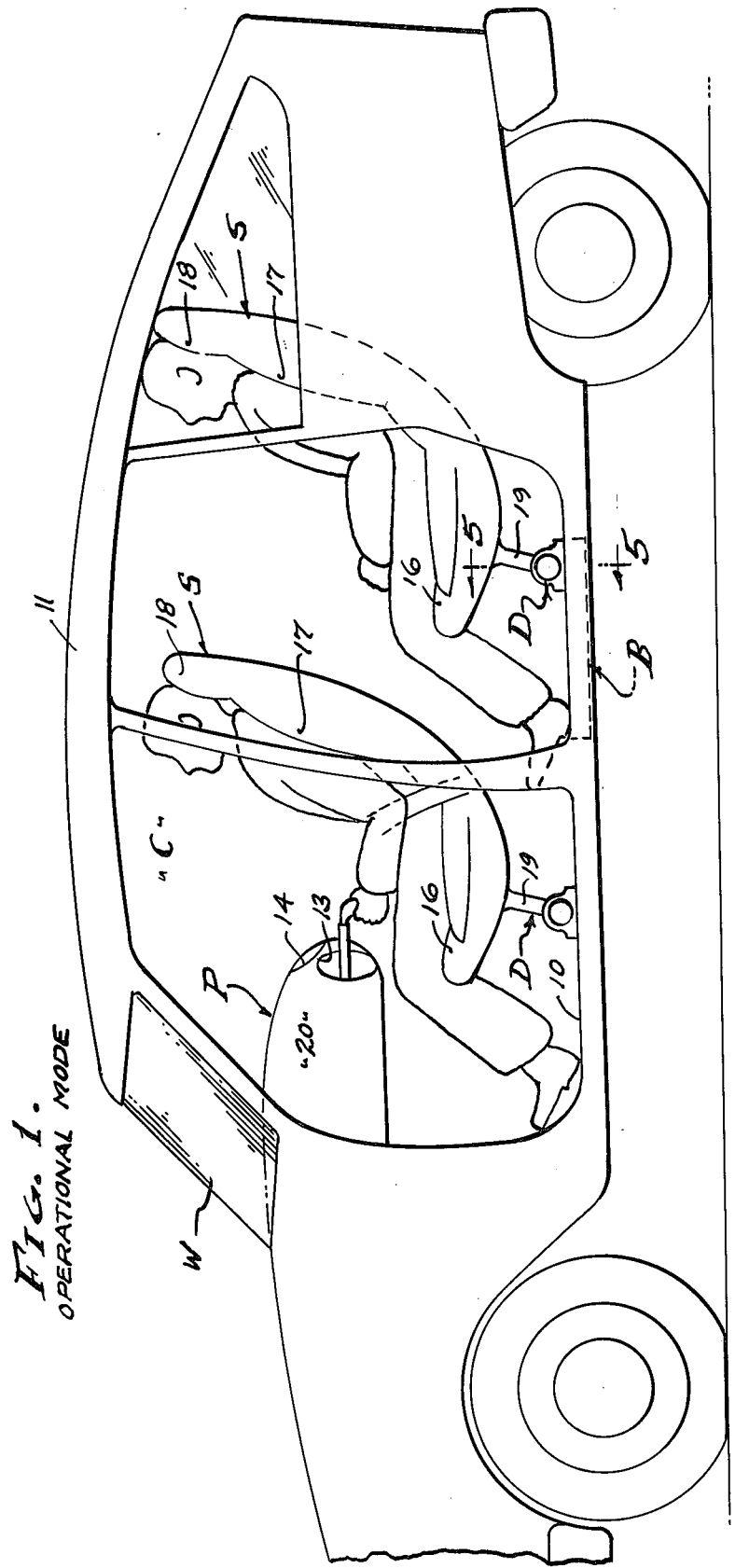
FIG. 1 is a side elevation of a vehicle and its passenger compartment incorporating the features of the present invention, in a normal operating condition.

This invention relates to safety seating within the passenger compartment of vehicles, whereby the occupants are protected against primary and secondary impacts as caused by one or a series of collisions. It is the sequence of collisions that are prepared for when a first or initial collision takes place and which is presumably a substantially head-on accident of the vehicle involved, and all of which produces longitudinally disposed deceleration forces. It is an automobile or the like with which this invention is primarily concerned, the concept being applicable to light aircraft as well as to large commercial aircraft and to multi-passenger vehicles such as busses and trains.

As shown throughout the drawings, there is a vehicle passenger compartment C and which comprises a confining cage or framework with a floor 10, a roof 11 and a front panel P. In the embodiment shown, the panel P is a dash panel disposed transversely beneath a front window W that extends upwardly and rearwardly from the front extremity of the panel to the roof 11. As is customary, the window W curves forwardly as it extends between side posts (not shown). In accordance with this invention, the panel P presents a cushion of energy absorbing material that extends transversely of the side posts to partially overlie the laps of the front occupants of the compartment C, namely the driver and front passenger. The cushioned panel is ported at 13 for manual access to the steering and controls as indicated, and is ported at 14 for visible access to the instrumentation. As will be described, the panel P is formed so as to buckle upon impact and thereby establish partial occlusion of window W and to present a face cushion for protection of the passenger's head coming into forceful engagement therewith. It should be noted that a necessary adjunct to this invention is the replacement of the customary steering wheel with pivoting pistol grip steering controls; said controls should be designed to retract into the dash panel. This modification is within the state of the art and present mechanical design and is outside the scope of this invention.

Referring now to the seating, there is at least a front seat S disposed in spaced opposition to the dash panel P and of contoured configuration to form fit a seated passenger and presenting a cushion of energy absorbing material faced to the front for the one singular passenger to be seated thereon, and alternately faced both front and back when a passenger is to be seated rearwardly thereof. Accordingly, the rear seat S of a multi-passenger vehicle is disposed in spaced opposition to the back of the front seat and is also of contoured configuration to form fit a seated passenger. In practice, the seats S are bucket seats comprised of a perimeter frame 15 within which there are the seat and back cushions 16 and 17 that continue one into the other in arcuate form with a narrow upper portion 18 to form a head rest.

Each seat is carried by a pedestal 19 pivoted to the floor 10 for vertical as well as longitudinal and angular adjustments to be accomplished in a conventional manner (not shown) as may be required. In accordance with this invention, the front seat S is adjusted direct to the floor 10 while the back seat S is adjusted to what will be termed a "slot-box" B. Characteristically, the seats S following seats in front thereof are carried by an energy absorption means comprised of the said slot-box B which includes a crushable member or restraining means which serves to retain the seat S at its rearmost position during normal use.

Figure 3:
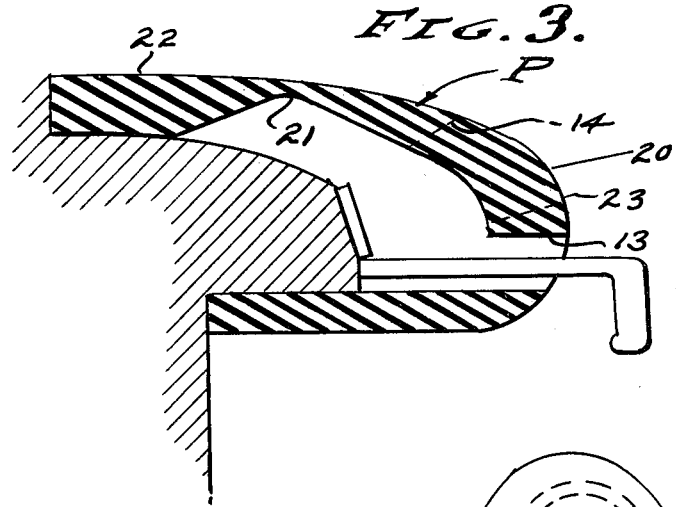
FIG. 3 is an enlarged cross sectional view of the dash panel as it is initially formed and in the normal operating condition.
Figure 4:
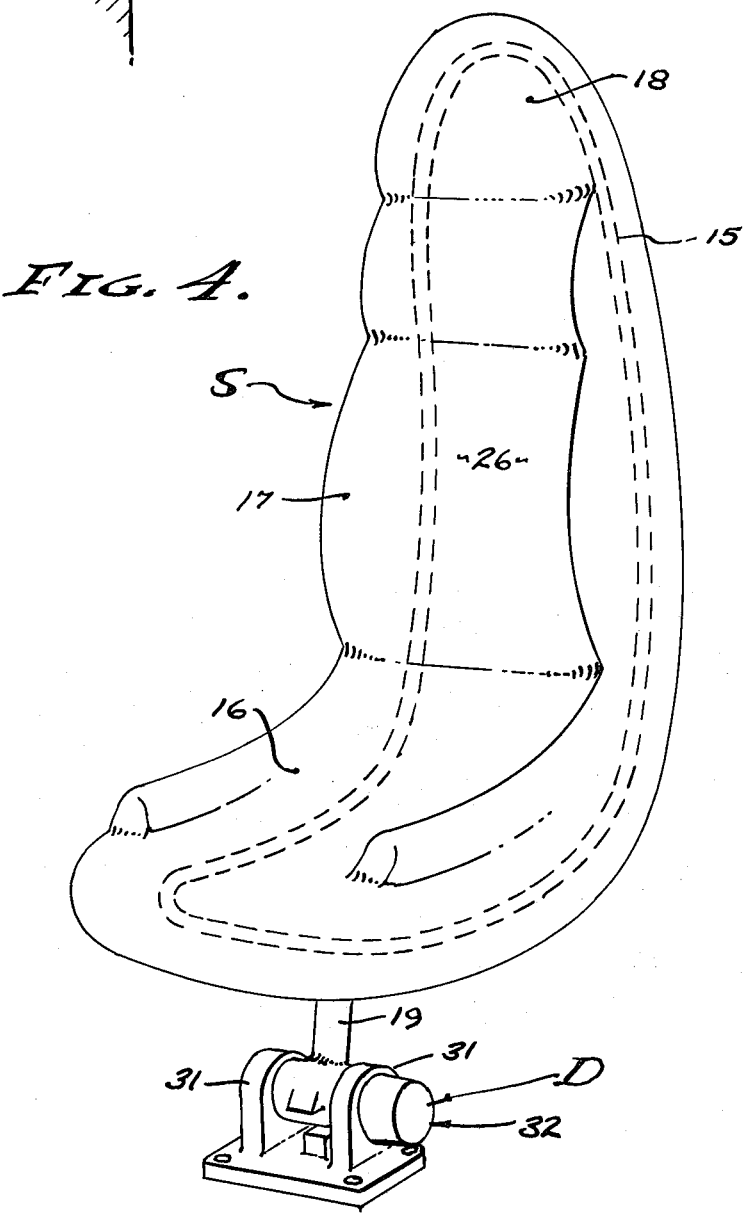
FIG. 4 is a perspective view of one of the passenger seats as it appears in the normal operating condition.

The dash panel P is of the initial configuration shown in FIGS. 1 and 3, molded or otherwise formed of a cushion material that is depressible for the absorption of impact energy as it is applied by the body of a passenger forcibly engaged thereagainst by severe deceleration forces. A foamed elastomer or the like is molded into the configuration shown in the form of a deep transverse shelf extending over the knees of the seated passengers and with its exterior mold line established and protected by a supple skin or pliable surfacing 20. In practice, the control hardware and instruments of the vehicle are recessed well below the surface 20, as for example ten inches deep, with the ports 13 and 14 therethrough for access and exposure of the steering, controls and instruments.

Figure 2:
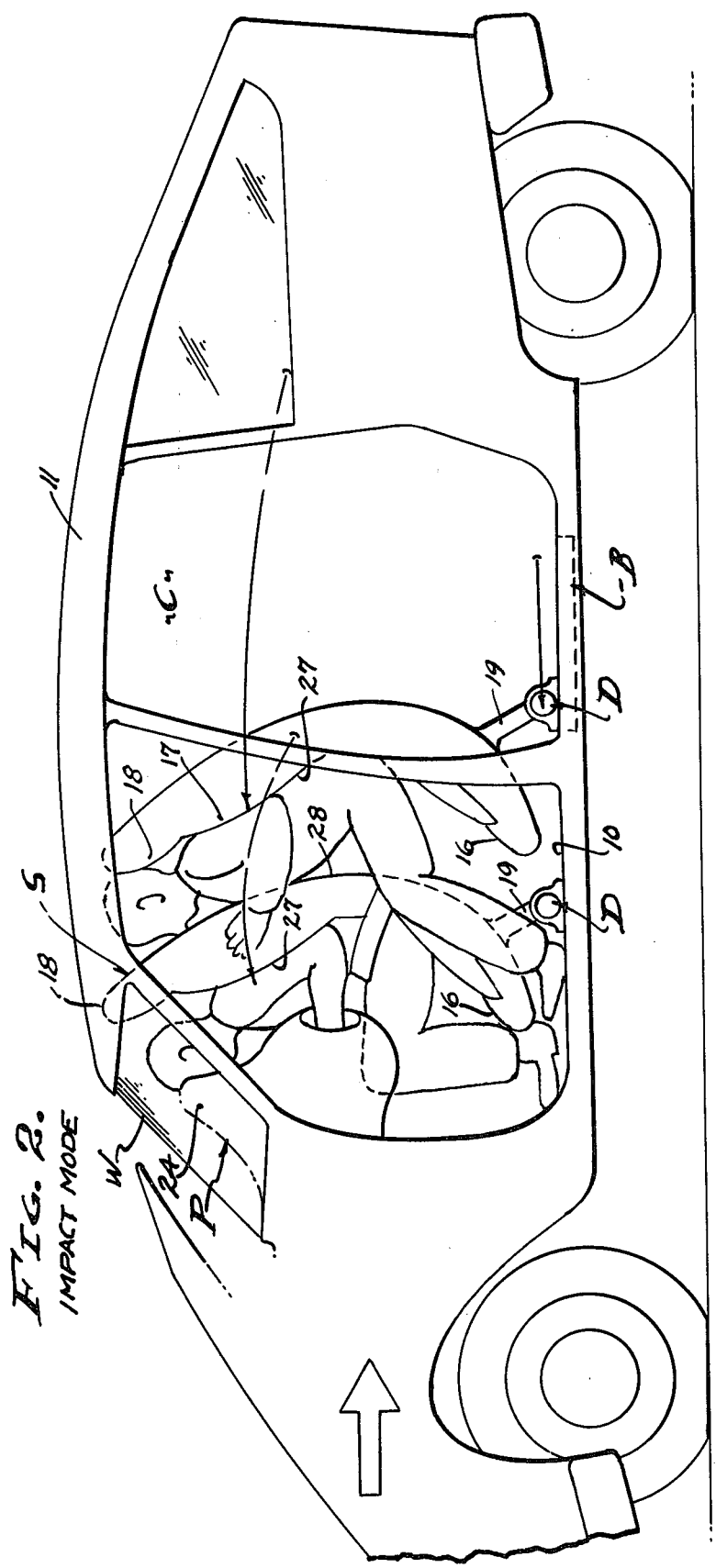
FIG. 2 is a view similar to FIG. 1 showing the post impact condition.

In accordance with this invention, the dash panel is recessed at 21 transversely of its interior, being of shell-like formation, and between its front and rear margins 22 and 23 which remain of full body or thickness, all without disturbing the normal exterior contour thereof. However, in the post impact mode as shown in FIG. 2, the recessed portion 21 of reduced cross section buckles upwardly to partially occlude the front window W and to present the cushion 24 that is thereby positioned to receive the impact of a forwardly moving front passenger's head. The foamed elastomer is quickly depressed by the forceful high impact load, and has memory so as to return to its original configuration.

The seats S are alike and a description of one will suffice for all. As hereinabove described, the seat S involves a perimeter frame 15 that carries the seat cushion 16, the back cushion 17 and the head rest cushion 18, in one arcuate continuation of contoured profile to form fit a passenger in a seated posture. In the preferred form, the frame 15 is encased within an envelope 26 of foamed elastomer molded or otherwise formed as a cushion of material that is depressible from both front and back, or top and bottom as the case may be, for the absorption of impact energy as it is applied by deceleration forces on the seat structure and/or by the body of a rear passenger forcibly engaged thereagainst. A substantially deep cushion is provided, of varied thickness, depending upon contour, ranging from several inches to a nominal six inch thickness.

In accordance with this invention, the seats S are arcuately complimentary one to the other, and the front seats S arcuately complimentary to the dash panel P, when combined as disclosed herein and with the seated passengers in the post impact mode position shown in FIG. 2. It will be observed that the convexly contoured surface 20 of dash panel P when impacted by the front seat passenger conforms to the anterior and/or abdominal area of the seated front passenger, while the inside 27 of the front seat conforms to the seated posture of said passenger's posterior and/or back side. Similarly, the convexly contoured back or outside 28 of the front seat S conforms to the anterior and/or abdominal area of the seated rear passenger, while the inside 27 of the rear seat conforms to the seated passenger's posterior and/or back side. The post impact mode thereby safely clamps the passengers within the confines of cushioning as shown, protected by the integrity of the compartment C.

Referring now to the mounting of the seats S, the pedestal 19 is pivotally secured to the floor 10 by energy absorbing positioning means D that normally secures the seat in the operational mode as shown in FIG. 1, and which restricts the seat to swing forwardly into a stopped post impact mode as shown in FIG. 2 where it is releasably locked during the accident sequence. The pivoted axis of the means D is disposed transversely beneath the seat cushion 16 with friction to hold the operational position of the seat S against a stop 29. The seat mounting post or pedestal 19 is attached to the energy absorbing positioning means D by a transverse pivot pin 30 that engages through spaced trunnions 31 and controlled by a hydraulic dashpot device 32. The pivot pin 30 is keyed to and rotates with the pedestal 19 and has a helical slot 33 engageable with a follower or part of a spring loaded swashplate 34, causing axial motion in the swashplate when the seat S pivots to swing forwardly. The swashplate 34 has a check valve 35 that permits it to move with relative ease toward the outer end of the dashpot cylinder 36 during forward movement of seat S, thereby displacing hydraulic fluid between outer and inner cylinder chambers. The swashplate springs are compressed and the seat limited in its forward rotation by a stop 37, whereupon the check valve closes trapping hydraulic fluid so as to prevent the seat from rebounding. The stored energy in the compressed seat cushions plus swashplate spring force causes the hydraulic fluid to bleed back through orifices or the like, permitting the swashplate to be slowly released from the locked position. In practice, an orifice groove 38 extends axially in the surface of the pin 30 to cooperate with the swashplate 34 for controlling the rate of return, said groove being of increasing cross section so as to speed the return rate as it progresses and/or to release restraint at a determined position.

Referring now to the slot-box B, the rear seat S, or a seat located behind another seat, is mounted by the means D to a positioning structure that permits the axis of the mounting pin 30 to shift forwardly during the deceleration phase of the initial collision and be secured in the post impact mode as shown in FIG. 2. The trunnion blocks of the rear seat S is attached to the slot box B which is integrated with the vehicle floor 10. The box B accommodates a collapsible member 39 of displaceable or crushable material or other such restraint means which serves primarily to retain the trunnion block base at its rearmost operational position during normal usage. The trunnion block base is equipped with captive rollers 40 or the like operable in tracks 41 disposed longitudinally in the upper surface of the box. For example, so that with deceleration forces in excess of twice that of gravity the seat mounting will slide forwardly relative to the slot-box displacing and/or crushing the member 39. When crushable material is employed, the slot-box B contains the same. However when displaceable material is employed, the slot-box is provided with apertures in the form of extrusion holes through which the material is expendably extruded. The rear seat trunnion block is mounted onto the slot-box B by means of the captive rollers 40, and there being a paddle 43 rigidly secured to an arm 44 depending from said trunnion block and through a longitudinally disposed slot 45 in the top of said box. Upon impact, inertia causes the collapsible member 39 to compress and crush and/or extrude through the holes in the sides, bottom, and front of the box (as shown). Forward motion of the trunnion block continues until the paddle 43 reaches a stop 46 where the paddle is restrained from rebound by a resilient ratchet leaf 47 that projects from the bottom of the box to capture the paddle in a forward position, there being at least one or a series of such stops.

From the foregoing it will be seen that the principle feature of the vehicle safety seating hereinabove described is the ability of the seat to pivot forward during sudden deceleration and trap the passenger against the padded back of the front seat or a padded dash panel. As described, the seats are equipped with hydromechanic means which permits them to pivot forward with relative ease, but which locks and/or restricts said seats forwardly and so as to delay rearward motion subsequent to an accident. The shock of passenger impact against the curved dash panel or seat back is distributed more or less evenly over the anterior side of the passenger, reducing the unit force of impact and thus the possibility of internal injury. Furthermore, the occupant's head is also restrained, thereby reducing possible neck and head injuries. The seat frame can be of molded glass fibers, and with this invention the seat belts are associated directly with the seat frame so that the anchor points therefor move with the seat.

Optimum operation of this system requires that the several key features, namely the said seat, and inertia characteristics of the dash pot, the frictional characteristics of the pivot mechanism and slot-box be balanced so as to provide a sequential and therefore minimal shock load to the passengers being protected. When forward seat movement has stopped, rebound of the seating and the occupants restrained thereby is prevented by the dash pot means, with its spring pressure on the swashplate that gradually releases the locking action, permitting the passenger to push back to an upright seated position. When initial impact occurs, the front seat passengers are projected against the padded dash panel simultaneously with forward rotation of the front seat, thereby clamping the passenger against the dash panel before rebound can occur; and the use of seat belting ensures this simultaneous action. The rear passenger, having a greater distance to travel before impact, will subsequently impact with the back of the forward seat either during said seat movement or after it has reached the limit of its travel and stopped in position against the forward occupant. The shock load of the seat and rear occupant will be considerably less than the initial shock of the front seat passenger against the dash, since a substantial portion of the rear seat forces is transmitted to the vehicle structure through the energy absorbing positioning means for the rear seat.

Having described only a typical preferred form and application of my invention, I do not wish to be limited or restricted to the specific details herein set forth, but wish to reserve to myself any modifications or variations that may appear to those skilled in the art:

I claim:

1. A vehicle safety seating adapted to embrace a seated occupant during an accident sequence and including in combination:
    a depressible cushion of energy absorbing material in complimentary opposition to the anterior form of the seated occupant;
    a seat with a depressible cushion of energy absorbing material in complimentary supported engagement with the posterior form of the seated occupant;
    means stopping the seat and comprised of spaced rear and forward stops, the rear stop stopping the seat in a normal operational mode free to move forwardly in the event of severe deceleration, and the forward stop stopping the seat in a post impact mode in spaced relation to the first mentioned cushion with the occupant embraced between the first mentioned cushion and the seat cushion;
    and means restraining rearward movement of the seat from said post impact mode in spaced relation to the first mentioned cushion with the occupant protectively compressed therebetween.

2. The vehicle safety seating as set forth in claim 1, wherein the first mentioned depressible cushion of energy absorbing material is a shell-like dash panel extending at least partially over the lap of said occupant and with a transverse recess between its front and rear margins to weaken the same for upward buckling into raised cushioning to receive impact from the head of said occupant.

3. The vehicle safety seating as set forth in claim 1, wherein the first mentioned depressible cushion of energy absorbing material is a shell-like dash panel extending at least partially over the lap of said occupant and with a transverse interior recess between its front and rear margins to weaken the same for upward buckling into raised cushioning to receive impact from the head of said occupant and ported for access to the vehicle controls and instruments recessed within said shell-like dash panel.

4. The vehicle safety seating as set forth in claim 1, wherein the means restraining rearward movement of the seat from said post impact mode comprises variably restrictive retard means permitting the occupant to forcibly move the seat rearwardly.

5. A vehicle safety seat adapted to decelerate with the absorption of energy during an accident sequence, and including in combination:
    a passenger compartment having a floor;
    a seat pivotally mounted on a transverse axis to the floor to swing forwardly and rearwardly and for complimentary support engagement with the posterior form of a seated occupant;
    a control means with a stop holding the seat in a normal operational mode free to swing forwardly in the event of severe deceleration to a post impact mode, and comprising a cylinder and spring biased piston and a fluid check valve retarding return of the piston from the post impact mode to the normal operational mode.

6. The vehicle safety seat as set forth in claim 5, wherein the piston is in the form of a swashplate disposed on said axis and engaged by means to follow movement of the said seat.

7. The vehicle safety seat as set forth in claim 5, wherein the piston is in the form of a swashplate axially shiftable over said pin and engaged by means to follow movement of the said seat and operable between opposite cylinder chambers surrounding said pin.

8. The vehicle safety seat as set forth in claim 5, wherein the piston is in the form of a swashplate axially shiftable over said pin and engaged by means to follow movement of the said seat and operable between opposite cylinder chambers surrounding said pin, and wherein an axial orifice groove of variable cross section cooperates with movement of the swashplate to vary the rate of its movement controlling return of said seat to the normal operational mode.

9. A vehicle safety seat mounting adapted to decelerate with the absorption of energy during an accident sequence, and including in combination:
    a passenger compartment having a floor;
    a seat carried by track means upon a box secured to the floor and to move in alignment with forces applied by deceleration;
    a slot in the box and in said alignment to carry a paddle by and with movement of the seat to engage a collapsible member captured in the box.

10. The vehicle safety seat mounting as set forth in claim 9, wherein the said collapsible member is made of crushable material.

11. The vehicle safety seat mounting as set forth in claim 9, wherein the box is perforated with openings and the said collapsible member is made of material extrudable through the said openings.

12. The vehicle safety seat mounting as set forth in claim 9, wherein the paddle and seat are captured in a forward position by at least one stop.

13. The vehicle safety seat mounting as set forth in claim 9, wherein the paddle and seat are captured in a forward position by one of a series of stops.

14. A vehicle safety seating adapted to embrace seated front and rear occupants during an accident sequence, and including in combination:
    a passenger compartment having a floor;
    a dash panel extending transversely of the passenger compartment with a depressible cushion of energy absorbing material in complimentary opposition to the anterior form of and at least partially over the lap of the front seat occupant;
    a front seat mounted to the floor and with a depressible cushion of energy absorbing material with its front in complimentary supported engagement with the posterior form of the seated front occupant and with its back in complimentary opposition to the anterior form of the rear seat occupant;
    a rear seat carried by track means upon a box secured to the floor and to move in alignment with forces applied by deceleration and with a depressible cushion of energy absorbing material in complimentary supported engagement with the posterior form of the seated rear occupant;

a slot in the box and in said alignment to carry a paddle by and with movement of the rear seat to engage a collapsible member captured in the box;

means individually stopping the front and rear seats each in a normal operational mode free to move forwardly in the event of severe deceleration to a post impact mode with the front seat in spaced relation to the depressible cushion of the dash panel and with the rear seat in spaced relation to the depressible back of the front seat cushion;

and means individually restraining rearward movement of the front and rear seats from said post impact mode with the occupant protectively compressed between the aforesaid cushions respectively.

15. The vehicle safety seating as set forth in claim 14, wherein the means stopping the seats in a normal operational mode free to move to a post impact mode comprises, in each instance, spaced rear and forward stops, the latter stop determining the spaced relation of the aforementioned cushions with the occupant embraced therebetween.

16. The vehicle safety seating as set forth in claim 14, wherein the means restraining rearward movement of each of said seats from said post impact mode comprises retard means permitting the occupant to forcibly move the seat rearwardly.

17. The vehicle safety seating as set forth in claim 14, wherein the said collapsible member is made of crushable material.

18. The vehicle safety seating as set forth in claim 14, wherein the box is perforated with openings and the said collapsible member is made of material extrudable through the said openings.

19. The vehicle safety seating as set forth in claim 14, wherein the paddle and seat are captured in a forward position by at least one stop.

20. A vehicle safety seating adapted to embrace a seated front occupant during an accident sequence and including:

a dash panel extending transversely of a passenger compartment and with a shell-like depressible cushion of energy absorbing material in complimentary opposition to the anterior form of and extending at least partially over the lap of the front seat occupant and with a transverse recess between its front and rear margins to weaken the same for upward buckling into raised cushioning to receive impact from the head of said front seat occupant;

a front seat with a depressible cushion of energy absorbing material in complimentary supported engagement with the posterior form of the seated front occupant;

means stopping the front seat in a normal operational mode free to move forwardly in the event of severe deceleration to a post impact mode in spaced relation to the depressible cushion of the dash panel and with the front seat occupant protectively compressed between the dash panel and front seat cushions respectively.

21. The vehicle safety seating as set forth in claim 20, wherein the depressible cushion of the dash panel is ported for access to the vehicle controls and instruments recessed within said shell-like dash panel.

22. A vehicle safety dash panel adapted to receive the impact of an occupant during an accident sequence and including:

a depressible cushion of energy absorbing material extending transversely of and in complimentary opposition to the anterior form of and at least partially over the lap of the occupant;

and weakening means extending transversely of the upwardly disposed surface of the cushion for upward buckling upon forward impact of the occupant therewith and into raised cushioning to receive impact from the head of said occupant.

23. The vehicle safety dash panel as set forth in claim 22, wherein the depressible cushion is ported for access to the vehicle controls and instruments retractile and recessed, respectively, within said dash panel cushion.

24. The vehicle safety dash panel as set forth in claim 22, wherein the depressible cushion of the dash panel is shell-like extending at least partially over the lap of the occupant and with a transverse recess between its front and rear margins comprising the weakening means for upward buckling into said raised cushioning to receive impact from the head of said occupant.

25. The vehicle safety dash panel as set forth in claim 22, wherein the depressible cushion of the dash panel is shell-like extending at least partially over the lap of said occupant and with a transverse interior recess between its front and rear margins comprising the weakening means for upward buckling into said raised cushioning to receive impact from the head of said occupant.

26. The vehicle safety dash panel as set forth in claim 22, wherein the depressible cushion of the dash panel is shell-like extending at least partially over the lap of said occupant and with a transverse interior recess between its front and rear margins comprising the weakening means for upward buckling into said raised cushioning to receive impact from the head of said occupant and said shell-like cushion being ported for access to the vehicle controls and instruments retractile and recessed, respectively, within said shell-like dash panel.

* * * * *